United States Patent [19]

Iacovangelo et al.

[11] Patent Number: 5,529,805

[45] Date of Patent: Jun. 25, 1996

[54] METHOD FOR MANUFACTURING A DIAMOND ARTICLE

[75] Inventors: Charles D. Iacovangelo, Schenectady; Elihu C. Jerabek, Glenmont, both of N.Y.

[73] Assignee: General Electric Company, Worthington, Ohio

[21] Appl. No.: 310,449

[22] Filed: Sep. 22, 1994

[51] Int. Cl.$^6$ .................................................. C23C 16/00
[52] U.S. Cl. .................. 427/249; 427/255.4; 427/255.7; 427/372.2; 427/379; 427/399; 427/404
[58] Field of Search ..................................... 427/226, 228, 427/249, 255.7, 372.2, 255.4, 399, 404

[56] References Cited

U.S. PATENT DOCUMENTS

| | | |
|---|---|---|
| 3,650,714 | 3/1972 | Farkas . |
| 4,142,006 | 2/1979 | Choyke et al. ...................... 427/255.7 |
| 4,374,900 | 2/1983 | Hare et al. ............................. 428/551 |
| 4,605,343 | 8/1986 | Hibbs, Jr. et al. . |
| 4,649,992 | 3/1987 | Geen et al. . |
| 4,661,180 | 4/1987 | Frushour . |
| 4,767,050 | 8/1988 | Flood et al. . |
| 4,776,862 | 10/1988 | Wiand . |
| 4,784,023 | 11/1988 | Dennis . |
| 4,899,922 | 2/1990 | Slutz et al. . |
| 4,931,363 | 6/1990 | Slutz et al. . |
| 5,024,680 | 6/1991 | Chen et al. ............................... 51/295 |
| 5,037,704 | 8/1991 | Nakai et al. . |
| 5,055,424 | 10/1991 | Zeidler et al. ......................... 437/188 |
| 5,173,089 | 12/1992 | Tanabe et al. . |
| 5,328,715 | 7/1994 | Iacovangelo et al. ................. 427/250 |
| 5,346,719 | 9/1994 | Zarnoch et al. ....................... 427/250 |

FOREIGN PATENT DOCUMENTS

| | | |
|---|---|---|
| 0402671 | 12/1990 | European Pat. Off. . |
| 0541071A1 | 5/1993 | European Pat. Off. . |
| 201004 | 7/1992 | Japan . |
| 2091763 | 8/1982 | United Kingdom . |

Primary Examiner—Janyce Bell

[57] ABSTRACT

A diamond article, for example, a sheet-form diamond tool insert brazable in air. The diamond sheet has a dual layer coating, a chromium bonding layer and a protective braze compatible overcoat, such as a Ni overcoat. The interface between the Cr layer and the diamond substrate includes sufficient metal carbide component to provide adhesion. Once coated with the Cr layer and the protective overcoat, the dual-coated diamond insert may be air brazed to a tool substrate in a manufacturing environment using a standard braze without a vacuum furnace or special atmosphere. A method for manufacturing the diamond insert comprises the steps of depositing a chromium metal layer on a diamond substrate, depositing a substantially non-oxidizable protective layer on the metal layer and heating the dual-coated diamond article at a temperature for a sufficient time. The diamond insert is coated and heat treated in an oxygen- and nitrogen-free atmosphere to create metal carbide at the diamond-coating interface.

12 Claims, No Drawings

METHOD FOR MANUFACTURING A DIAMOND ARTICLE

CROSS-REFERENCE TO RELATED APPLICATIONS

The present application contains subject matter related to U.S. application Ser. No. 08/286,076, filed Aug. 4, 1994, now U.S. Pat. No. 5,500,248, commonly assigned.

BACKGROUND OF THE INVENTION

The present invention relates to brazable articles, and more particularly to a brazable in air diamond tool insert fabricated from a diamond substrate having a bond coat deposited thereon.

The use of diamond tools in the superabrasives market is widespread. Diamond inserts can be fabricated from natural monocrystalline diamond, sintered polycrystalline diamond (PCD) blanks often referred to as compacts, or thermally stable diamond (TSD). More recently, polycrystalline diamond sheets prepared by CVD have been used as diamond tool inserts.

Diamond is often bonded to tungsten carbide tools to improve the performance of the tool. The greatest impediment to the use of diamond in tools is the difficulty of achieving adequate bond between the diamond and the cemented tungsten carbide tool base used to give strength to the tool. Thermal oxidation of diamond above about 700° C. is the chief limiting factor to the achievement of an adequate bond. Typically, bonding is carried out at temperatures of 1000°–1200° C. in a controlled vacuum using braze alloys that contain transition metals to give adhesion to the diamond. Careful control of the oxygen partial pressure is required to prevent oxidation of the diamond and the transition metals.

While this high temperature brazing process gives satisfactory results, it is difficult to manage in production, uses expensive and often brittle brazes, and requires expensive equipment not usually found in the manufacturing environment in which the tools are used. There is a great need in the industry, therefore, for a diamond tool insert that can be brazed in air with standard low temperature brazes. To enable the brazing of diamond in air a coating material is needed that will bond to diamond and make a good metallurgical bond to the braze in an oxygen containing environment.

The prior art is deficient in satisfactory techniques for brazing diamond, especially CVD diamond, to tools. Prior art approaches taken to bonding of diamond to tools generally fall into three categories: geometric effects, coatings or intermediate layers, and brazes. For example, U.S. Pat. No. 4,931,363 discloses the use of high temperature brazes containing chromium for improved bonding of diamond compacts to tungsten carbide tools. European Patent Application, Publication No. 0 402 671 discloses the use of high temperature carbide forming brazes to bond CVD diamond. Each of these, however, require high temperature brazes that must be bonded in controlled vacuum environments.

In U.S. Pat. Nos. 4,649,992, 4,661,180, 4,767,050, and 4,784,023, various geometric approaches to improving adhesion are presented, for example, frustoconical shapes, interlocking alternating ridges, and pocketed substrates. These approaches, however, still require expensive high temperature brazes and vacuum processing.

The use of coatings and interlayers is also disclosed in the prior art. For example, U.S. Pat. No. 4,776,862 discloses the use of carbide forming transition metals as coatings on powders that are then brazed. U.S. Pat. No. 5,037,704 discloses the use of transition metal carbide formers as coatings on compacts prior to protective brazing. United Kingdom Patent Application, Publication No. GB 2 091 763 discloses the use of carbide forming transition metals as additives to abrasive powders during high pressure and temperature sintering. Finally, Japanese Kokai Patent Application No. HEI 4[1992]-21004 discloses the use of a thick transition metal layer, typically 1–5 mm, between diamond and tool substrates prior to brazing in vacuum, typically at 1100° C. While these references disclose the use of transition metals to improve adhesion to diamond, they do not address the issue of brazing in air.

As mentioned above, the greatest impediment to the use of diamond in tools is the difficulty of achieving adequate bond between the diamond and the cemented tungsten carbide tool base which is used to give strength to the tool. Thermal oxidation of diamond above about 700° C. is the chief limiting factor to the achievement of an adequate bond. It would be desirable, particularly for on site replacement of worn diamond tool inserts, to have a diamond insert brazable in an air environment using a standard low temperature braze alloy.

It is an object of the present invention to provide a diamond article which may be directly brazed to a tool body in air.

It is another object of the present invention provide a diamond article which may be strongly bonded to a tool body with low temperature braze.

It is another object to alter the surface of a diamond article so that a strong brazed joint may be easily formed at the work location.

Other and additional objects will become apparent from the description of the invention as set forth herein.

SUMMARY OF THE INVENTION

In accordance with the present invention, there is provided a diamond article for brazing to a substrate comprising a diamond substrate; a chromium metal layer bonded directly to said diamond substrate through an interface comprising chromium carbide to provide adhesion of said metal layer to said diamond substrate; a substantially non-oxidizable protective layer comprising a braze compatible material disposed on and adhered to said metal bonding layer.

According to another aspect of the present invention, the diamond article is brazed to a body, such as tool body, through a braze and a compatible substantially non-oxidizable protective layer.

According to another aspect of the present invention, a diamond article is prepared by depositing a chromium metal layer on a diamond substrate; depositing a substantially non-oxidizable protective layer on the metal layer to form a dual-coated diamond article; and heating the metal layer at a temperature and for a time sufficient to form chromium carbide at the interface between the metal layer and the diamond substrate to provide adhesion of the metal bonding layer to the diamond substrate.

For a better understanding of the present invention, together with other objects, advantages, and capabilities thereof, reference is made to the following Description and appended Claims.

DETAILED DESCRIPTION OF THE PREFERRED EMBODIMENTS

The article of the present invention includes a diamond substrate, a chromium metal layer bonded to the diamond substrate, and a protective layer disposed over the chromium bonding layer to present a barrier against oxidizing the chromium layer. The diamond substrate is preferably a chemically vapor deposited (CVD) diamond. Such diamond substrates may be typically cut from a CVD diamond layer which has been separated from a growth substrate. This layer may be thinned to a preferred thickness. The major opposing surfaces of the substrate may be planarized and/or thinned to the desired surface finish by mechanical abrasion or by other means such as laser polishing, ion thinning, or other chemical methods. Preferably, conductive CVD diamond layers can be cut by electro-discharge machining, while insulating films can be cut with a laser to form discs, squares, or other symmetrical shapes.

Typical CVD diamond substrates include spaced apart parallel flat surfaces. One technique for making diamond substrates is set forth in U.S. Pat. No. 5,110,579 to Anthony et al. According to the processes set forth in the patent, diamond is grown by chemical vapor deposition on a substrate such as molybdenum by a filament process. According to this process, an appropriate mixture such as set forth in the example is passed over a filament for an appropriate length of time to build up the substrate to a desired thickness and create a diamond film. As set forth in the patent, a preferred film is substantially transparent columns of diamond crystals having a <110> orientation perpendicular to the base. Grain boundaries between adjacent diamond crystals having hydrogen atoms saturating dangling carbon bonds is preferred wherein at least 50 percent of the carbon atoms are believed to be tetrahedral bonded based on Raman spectroscopy, infrared and X-ray analysis.

Such a diamond sheet may be fabricated by the CVD process disclosed in commonly assigned U.S. patent applications Ser. No. 07/366,823, now abandoned and U.S. Pat. No. 4,958,592 entitled Resistance Heater for Diamond Production by CVD issued Sep. 25, 1990, both incorporated herein by reference. In this process, a diamond layer is grown on a surface by a low pressure CVD process, then the diamond layer is removed from the surface, forming the diamond sheet. Alternatively, any suitable CVD or other method for making a diamond sheet may be used. If desired, the diamond sheet may be mechanically or chemically processed to preselected dimensions before coating.

The diamond film typically has one surface corresponding to an initial growth surface. This initial growth surface corresponds to the sin face that was adjacent to a support substrate, such a molybdenum, upon which CVD diamond is initially nucleated. This surface typically has a very fine diamond grain structure. As the film grows and as the growth is discontinued when the desired thickness is obtained, an opposing or top surface is formed which may typically have a larger diamond crystal structure. It is contemplated that CVD diamond having such preferred properties and structure may be produced by a variety of other techniques such as microwave CVD and DC jet CVD. It has been discovered that as the quality of the CVD diamond improves, i.e. less surface imperfections and less impurities, it becomes increasing difficult to obtain a good bond between the diamond substrate and a tool body. The present invention is particularly suited for use with diamond that is grown under very pure process conditions and may be applied to either surface.

In accordance with the principles of the present invention, a chromium metal containing layer is deposited directly on the diamond substrate. This deposition may be performed by known method, e.g., by CVD or by a physical vapor deposition (PVD) method such as sputtering or by plating. The chromium metal containing layer preferably consist entirely of chromium metal.

Next the chromium metal coated diamond, is heated at a temperature and for a time sufficient to create the metal carbides of chromium, at an interface between the diamond substrate and the chromium metal layer. The heat treatment results in the formation of sufficient metal carbides at the interface between the metal bonding layer and the diamond substrate to provide the desired adhesion of the metal bonding layer to the diamond substrate. Desirably the degree of adhesion is greater than 20 Kpsi in shear, i.e. Instron shear test. The heating step may be performed either after deposition, as in the case of sputtered deposits, during deposition, as in the case of high temperature CVD processes, or at later stages of processing a completed tool.

The heating step is preferably carried out in an inert atmosphere or vacuum. An oxygen and nitrogen-free atmosphere desirably minimizes reactions which might result in the formation of oxides and nitrides of chromium. The time and temperature of heating is sufficient to create the carbide component at the interface between the diamond substrate and the chromium coating to enhance adhesion. The amount of chromium carbides created must be sufficient to provide adhesion of the chromium bonding layer to the diamond substrate. Typically, the heat treatment is performed at about 700°–960° C. for about 5–60 min. Heat treating at about 900° C. for about 15 min provides excellent bonding of the alloy coating to CVD diamond.

A typical heat treating atmosphere is an argon or hydrogen-argon mixture. An argon or hydrogen/argon gas mixture (5:95, $H_2$:Ar) with or without titanium as an oxygen and nitrogen getter have proven to be a satisfactory atmosphere for such heat treatment. The hydrogen in this atmosphere serves to prevent oxidation of the chromium.

Although the chromium alloy bonds well to the diamond, the braze used to bond the diamond insert to the tungsten carbide tool does not readily wet the chromium metal coating. As described herein, a protective overcoat on the chromium layer provides good adhesion to the bonding layer, protects the chromium and the diamond from oxidation, and affords compatibility with the braze.

An adherent protective layer is deposited by known methods, e.g., CVD, PVD, or plating directly onto the chromium metal layer to form a dual-coated diamond article. The protective layer desirably covers the entire underlying metal layer so as to prevent deleterious chemical change, i.e. nitriding and oxidizing reactions, and loss of integrity due to exposure to the typical working environment. The protective layer is desirably compatible with the brazing material that is subsequently utilized to braze the resulting diamond coated article to a substrate. Preferred metals for the protective layer comprises nickel or alloys thereof. Preferred braze compatible alloys include the alloys of nickel with chromium. The preferred protective layer desirably consist essentially entirely of the above mentioned components. The most preferred protective layer is a nickel-chromium alloy.

Achieving optimum adhesion between the protective layer and the underlying chromium layer also involves a heat treatment, described further below. Since the chromium component of the metal layer tends to wet poorly with braze, the heat treatment should be carried out under conditions which reduce the migration of chromium into the protective layer. The nickel component of the alloy enhances the braze compatibility of the chromium.

The same heat treatment used to bond the chromium metal layer to title CVD diamond may be utilized to bond the protective layer to the chromium metal layer. Thus, the two layers conveniently can be heat treated at the same time after the application of the two layers. As previously discussed, argon or hydrogen/argon gas mixture (5:95, $H_2$:Ar) with or without titanium as an oxygen and nitrogen getter have proven to be a satisfactory atmosphere for such heat treatment. The hydrogen in this atmosphere serves to prevent oxidation of the Cr, Ag and Ni.

Once coated with the chromium bonding layer and the protective overcoat, this dual-coated diamond article, for example, a sheet-form diamond tool insert, may be brazed in air to a tool substrate using a standard braze and without requiring a vacuum furnace or special atmosphere. Typical standard brazes are the silver brazes which have liquidus temperatures of 600–900 degrees Centigrade. An example of such a braze is Easy-Flo 45 (a product of Lucas Mulhaupt, Inc.,), an alloy of, in % by weight, 45% silver, 15% copper, 16% zinc, and 24% cadmium with a liquidus temperature of 620° C. The brazing technique employed may be induction or other techniques known in the art. The present invention results in fabrication of coated diamond inserts suitable for brazing in air. Thus, a diamond tool insert may be replaced on site, for example, in a typical industrial environment such as a machine shop, in an ambient shop atmosphere.

The following Examples are presented to enable those skilled in the art to more clearly understand and practice the present invention. These Examples should not be considered as a limitation upon the scope of the present invention, but merely as being illustrative and representative thereof.

COMPARATIVE EXAMPLE 1

A series of CVD diamond discs, dimensions 5 mm in diameter and 0.2–0.50 mm thick, were cleaned in boiling 1:1:1 HCl:$HNO_3$:HF for 4 hours followed by boiling 4:1 $H_2SO_4$:$HNO_3$. A series of cleaned CVD diamond samples about 5 mm in diameter Size=0.20–0.30 mm thick were coated with Thickness=about 0.01–2.3 µm of Cr by sputtering or by a pack cementation CVD (PCCVD) process. Adhesion of the Cr coating was measured using either a tensile pull test or shear test. In the first a standard Sebastian pull test with cured epoxy pull pins was used. The limit of this test was 10 Kpsi due to the strength of the epoxy. The second test measured both the adhesion of the coating and brazability. Each coated Chemical Vapor Deposit Diamond (CVDD) sample was brazed by heating an assembly of the Cr coated sample, a brazing alloy preform, and a cemented WC substrate in air at about 700° C. for about 0.5–5 min. The cooled assembly was then sheared using an Instron shear strength tester. All brazing was done in air using Easy-Flo 45 braze alloy and Harris white braze flux. None of the sputtered samples exceeded ~0 Kpsi adhesion. The PCCVD samples achieved adhesion greater than about ~0 Kpsi. However, both types of samples exhibited unacceptable brazability, typical shear strengths being about 5–10 Kpsi.

EXAMPLE 2

A series of CVD diamond samples was Cr coated by sputtering, as described for Example 1. The coated samples were heat treated at 800° C. for 10–60 min in an $O_2$- and $N_2$-free, $H_2$-Ar atmosphere including Ti as an $O_2$ and $N_2$ getter. After brazing as described above for Example 1, the adhesion of the heat treated samples improved to at least 10 Kpsi tensile strength. However, compatibility of the Cr coating to air brazing with Easy-Flo 45 braze alloy proved to be poor. Generally, the carbides that formed in the coating either were poorly wetted by the braze alloy or the Cr was oxidized during the braze cycle.

EXAMPLE 3

The cleaned samples were coated with about 0.1–2.3 µm Cr by splattering, as described for Examples 1 and 2. A Ni or NiCr alloy (80:20, by weight, Ni:Cr) overcoat 0.01–2.0 µm thick was sputtered onto each Cr coated sample. Each sample was heat treated in one of two ways. Some of the samples were heat treated after Cr coating as described above, then a heat treatment at 700° C. for 10 min. was performed after Ni or NiCr coating. In the remaining samples, a single heat treatment was performed after Ni or NiCr coating to enhance adhesion of both the Cr and the Ni or NiCr coating. The same parameters described above for Example 2 were used. for the single heat treatment. The shear strengths of the samples after brazing as described above for Example 1 were as high as 30 Kpsi, showing failure predominately in the braze layer and not in the coating layers.

The thicker Cr coatings seemed to present little advantage over the thinner coatings, but a thickness above about 0.25 µm appeared to give the best performance. The Ni and NiCr coatings of thicknesses from 0.25–2.0 µm showed little difference in performance. The NiCr overcoat allowed a longer time, compared to the Ni overcoat, to move and align the insert on the tool substrate (scrubbing), an effect most probably attributable to a slower dissolving of the NiCr into the braze.

All samples achieved the limit of the tensile pull test of 10 Kpsi. In the shear test, all samples heat treated above 740° C. but below 960° C. to form the bond layer exceeded the 20 Kpsi goal, with good braze compatibility. Most of the shear test samples achieved about 30 Kpsi, with some of the failures occurring in the braze rather than between the coating and the diamond.

The invention described herein presents to the art novel, improved diamond tool inserts and other diamond articles suitable for brazing in air using a low temperature braze, as well as a novel method for their manufacture. The above-described diamond sheets brazed to cemented tungsten carbide or other hard substrates could be used as tool inserts, reamers, end mills, drill bits, dressers, cutting tools, and other applications known in the cutting tool art. Although the inserts described herein are polycrystalline CVD diamond sheets, other forms of diamond can be used as described to form diamond tools. For example, the diamond base for the coated insert can be natural monocrystalline diamond, sintered polycrystalline blanks (PCD) or thermally stable diamond (TSD). The invention also is not limited to cutting tool inserts. The same coatings and method are suitable to any application in which a diamond surface is to be brazed to another hard surface, particularly when air brazing is desired.

While there has been shown and described what are at present considered the preferred embodiments of the invention, it will be apparent to those skilled in the art that modifications and changes can be made therein without departing from the scope of the present invention as defined by the appended Claims.

We claim:

1. A method for manufacturing a diamond article comprising the steps of:
   - depositing a chromium metal layer on a diamond substrate, said metal layer and said diamond substrate forming an interface therebetween;
   - depositing a substantially non-oxidizable protective layer selected from the group comprising nickel (Ni) and nickel-chromium (Cv) alloy on said metal layer to form a dual-coated diamond article; and
   - heating said dual-coated diamond article at a temperature and for a time sufficient to form chromium carbide at the interface between said metal layer and said diamond substrate to provide adhesion of said metal layer to said substrate;
   - whereby said diamond article is brazable in air.

2. A method in accordance with claim 1 wherein said heating step is carried out as a single heat treatment performed on said dual-coated diamond article, and said temperature and time are sufficient to also enhance adhesion of said protective layer to said metal bonding layer.

3. A method in accordance with claim 2 wherein said heating is carried out in an atmosphere including sufficient hydrogen to prevent oxidation of said Ni and said Cr.

4. A method in accordance with claim 1 wherein said temperature is about 700°–960° C. said time is about 5–60 min, and said atmosphere is a hydrogen-argon mixture including an oxygen and nitrogen getter.

5. A method in accordance with claim 1 further comprising the step, after the heating step, of brazing said dual-coated diamond article to a tool substrate.

6. The method in accordance with claim 1, wherein said diamond substrate is a chemical vapor deposited diamond substrate.

7. A method in accordance with claim 1 wherein said temperature is about 700°–960° C., said time is about 5–60 min., and said atmosphere is hydrogen-argon mixture including an oxygen and nitrogen getter.

8. A method for manufacturing a diamond article comprising the steps of:
   - depositing a chromium metal layer on a diamond substrate to form a metal coated diamond substrate, said metal layer and said diamond substrate having an interface there between;
   - heating said metal coated diamond substrate at a temperature and for a time sufficient to form chromium carbide at the interface between said metal layer and said diamond layer;
   - depositing a substantially non-oxidizable protective layer selected from the group comprising nickel (Ni) and nickel-chromium (Cr) alloy on said metal layer to form a dual-coated diamond article; and
   - heating said dual coated diamond article at a temperature and for a time sufficient to enhance adhesion of said protective layer to said metal coated diamond substrate, whereby said diamond article is brazable.

9. A method in accordance with claim 8, wherein said protective layer is selected from the group comprising nickel (Ni) and nickel-chromium (Cr) alloy.

10. A method in accordance with claim 8 wherein said heating is carried out in an atmosphere including sufficient hydrogen to prevent oxidation of said Ni and said Cr.

11. A method in accordance with claim 8, wherein said diamond substrate is a chemical vapor deposited diamond substrate.

12. A method in accordance with claim 8 further comprising the step, after the heating step, of brazing said dual-coated diamond article to a tool substrate.

* * * * *